United States Patent [19]

Shirakawa

[11] Patent Number: 5,216,408
[45] Date of Patent: Jun. 1, 1993

[54] INTER-VEHICLE DISTANCE DETECTING DEVICE FOR AUTOMATIC TRACKING OF A PRECEDING CAR

[75] Inventor: Hiroyuki Shirakawa, Himeji, Japan

[73] Assignee: Mitsubishi Denki K.K., Tokyo, Japan

[21] Appl. No.: 700,990

[22] Filed: May 16, 1991

[30] Foreign Application Priority Data

Jun. 6, 1990 [JP] Japan .................................. 2-147936

[51] Int. Cl.⁵ .............................................. B60Q 1/00
[52] U.S. Cl. ................................... 340/435; 340/903; 358/126
[58] Field of Search ............... 340/435, 903, 461, 937, 340/904, 901; 358/105, 126; 180/169, 167; 364/424.01, 436, 456

[56] References Cited

U.S. PATENT DOCUMENTS

| | | | |
|---|---|---|---|
| 4,709,264 | 11/1987 | Tamura et al. ....................... | 358/105 |
| 4,847,772 | 7/1989 | Michalopoulos et al. .......... | 340/937 |
| 5,023,712 | 6/1991 | Kajiwara ............................. | 358/126 |
| 5,062,056 | 10/1991 | Lo et al. ............................... | 358/126 |
| 5,161,632 | 11/1992 | Asayama ............................. | 340/435 |
| 5,165,108 | 11/1992 | Asayama ............................. | 340/903 |

FOREIGN PATENT DOCUMENTS

| | | |
|---|---|---|
| 4040401 | 6/1991 | Fed. Rep. of Germany . |
| 4110132 | 10/1991 | Fed. Rep. of Germany . |
| 63-46363 | 9/1988 | Japan . |
| 1-35305 | 7/1989 | Japan . |

Primary Examiner—Brent A. Swarthout
Attorney, Agent, or Firm—Sughrue, Mion, Zinn, Macpeak & Seas

[57] ABSTRACT

An inter-vihicle distance detecting device for automatic tracking of a foregoing car which comprises: image sensors for taking images of a foregoing car; displaying means for displaying one of the images of the foregoing car being taken by the image sensors; an image taking window which repeats forward and backward movement horizontally from an end to the other end of a display of the displaying means at a predetermined speed; an image tracking starting switch being operable by a driver; image tracking means for tracking the image of the foregoing car, activated by the image tracking starting switch when the image of the foregoing car enters in the image taking window; and detecting means for detecting an inter-vehicle distance between a car of the driver and the foregoing car being displayed on the image taking window.

3. Claims, 3 Drawing Sheets

Image in memory 8        Image in memory 9

INTER-VEHICLE DISTANCE DETECTING DEVICE FOR AUTOMATIC TRACKING OF A PRECEDING CAR

BACKGROUND OF THE INVENTION

1. Field of the Invention

This invention relates to a device which detects optically and continuously an inter-vehicle distance between a car and a preceding car.

2. Discussion of Background

Formerly, as a distance detecting device of this kind, there are disclosed for instance Japanese Examined Patent Publication Nos. 380085/1988 and 46363/1988. Hereinafter, explanation will be given to FIG. 4. Numerals 1 and 2 signify a couple of optical lenses disposed on the left and on the right. In the signal processing unit 20, an image obtained from the image sensors 3 and 4 is shifted and superposed on another image. Finally the shift quantity "a" is obtained in which both images agree the most. The distance R to the object 21 is obtained by the following equation utilizing the principle of triangulation from the shift quantity "a".

$$R = \frac{fL}{a}$$

where f is the focal length of the lenses 1 and 2, and L is a base length between the lenses 1 and 2.

Furthermore, as an image tracking method of the preceding car taken by the image sensor, there is disclosed in for instance Japanese Examined Patent Publication No. 33352/1985. In this case, the above target is image-tracked by a method in which an operator looks at a display and sets a tracking gate (window) encircling a target to be tracked on the display.

In an inter-vehicle distance detecting device which continuously detects the inter-vehicle distance between a driving car and the preceding car to be tracked by combining an optical distance detecting device which utilizes image sensors and an image tracking device for a preceding car as mentioned above, as disclosed in the above Japanese Examined Patent Publication No. 33352/1985, it is almost impossible for a driver to set-up a window having a similar shape with the preceding car image, by using a joy stick, a track ball, or a mouse while driving the car.

SUMMARY OF THE INVENTION

It is an object of the present invention to provide an inter-vehicle distance detecting device for automatic tracking of a preceding car, capable of easily setting a tracking window of the preceding car while driving a car, and capable of identifying the preceding car for detecting the inter-vehicle distance, by following via a driving car, even when a plurality of preceding cars are running ahead of the drivers car.

According to the present invention, there is provided an inter-vehicle distance detecting device for automatic tracking of a preceding car which comprises:

image sensors for taking images of a preceding car;

displaying means for displaying one of the images of the preceding car being taken by the image sensors;

an image taking window which repeats forward and backward movement horizontally from an end to the other end of a display of the displaying means at a predetermined speed;

an image tracking starting switch being operable by a driver;

image tracking means for tracking the image of the foregoing car, activated by the image tracking starting switch when the image of the preceding car enters in the image taking window; and detecting means for detecting an inter-vehicle distance between a car of the driver and the preceding car being displayed on the image taking window.

BRIEF DESCRIPTION OF THE DRAWINGS

A more complete appreciation of the invention and many of the derived advantages thereof will be readily obtained as the invention becomes better understood by reference to the following detailed description when considered in connection with the accompanying drawings, wherein.

DETAILED DESCRIPTION OF THE PREFERRED EMBODIMENTS

Figure 1:
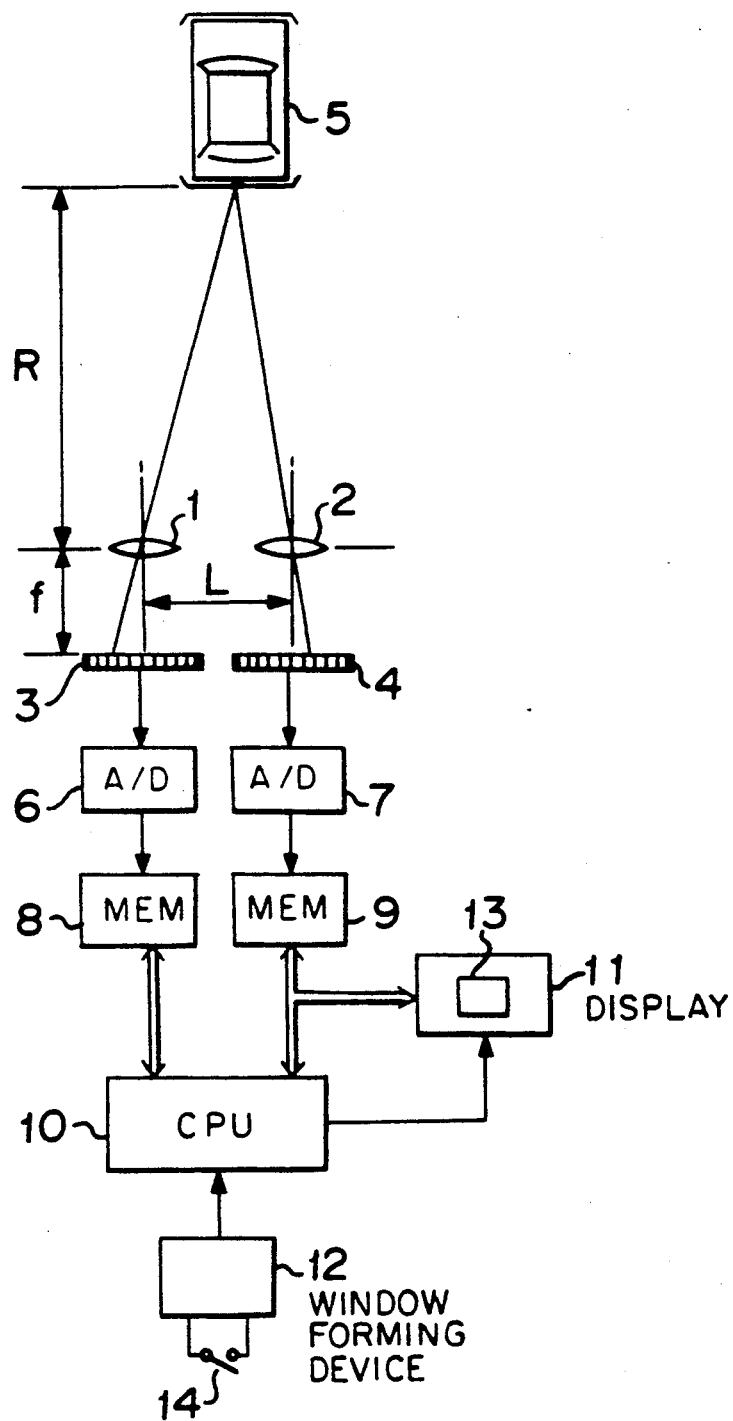
FIG. 1 is a system construction diagram showing an embodiment of an inter-vehicle distance detecting device for automatic tracking of a preceding car according to the present invention.

An embodiment of the present invention will be explained referring to the drawings. FIG. 1 is a system construction diagram showing an embodiment of an inter-vehicle distance detecting device for automatic tracking of a preceding car according to the present invention. In FIG. 1, numerals 1 and 2 signify lenses which constitute left and right optical systems, numerals 3 and 4, two-dimensional image sensors corresponding to the above lenses 1 and 2, respectively, and a numeral 5, a preceding car to be tracked. Numerals and 7 signify A/D convertors which convert analog signals from the above image sensors 3 and 4 to digital signals, numeral 8 and 9, memories, a numeral 10, a microcomputer, and a numeral 11, a display which displays an image taken by the above right image sensor 4 and which is controlled by the microcomputer 10. A numeral 12 signifies the device for forming the window 13 for image tracking, and a numeral 14, an instruction switch for starting up the image tracking, which is operated by a driver. Furthermore the window 13 which is formed by the window forming device 12, before the instruction switch 14 is operated, is set to perform a repeated forward and backward movement from one end to another end of the display 11, for instance from a left end to a right end.

Figure 2:
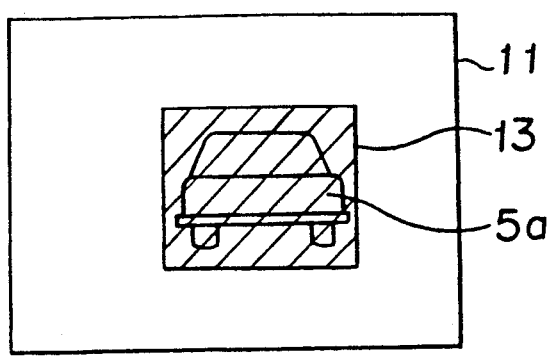
FIG. 2 is a display diagram showing a state in which a preceding car image is in a window.

FIG. 2 shows the above display 11. When the preceding car image 5a to be tracked, enters completely in the moving window 13, the driver turns ON the instruction switch 14 for starting up the image tracking operation. Then, the window 13 moves, catching the preceding car image 5a in the display 11 in spite of a movement of the preceding car. In this way, the image tracking operation of the preceding car image 5a by the window 13 is automatically carried out.

This image tracking operation after the window is set is similar to that of the conventional device which is disclosed in Japanese Examined Patent Publication Nos. 33352/1985 and 35305/1989.

Next, explanation will be given to the method of detecting the inter-vehicle distance between the driving car and the preceding car. First of all, the microcomputer 10 reads an image element signal in the window 13 which is tracking the preceding car image 5a, from the memory 9 and generates the image element signal, which is a reference image signal for calculation of the inter-vehicle distance. The microcomputer 10 selects a domain corresponding to the above window 13 in the memory 8 which memorizes the image signal of the left hand side image sensor 3, and calculates the total sum of the absolute value of the difference of signals at every left and right image element by successively shifting the image signal in the memory 8 with respect to the abovementioned reference image signal, element by element. That is, the position of the image which agrees most with the image in the window 13, is obtained by the successive shifting of the image, element by element.

Figure 3:
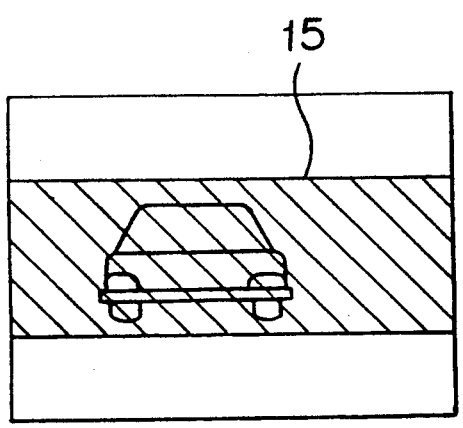
FIG. 3 is a display diagram showing an image domain for comparing with a reference image in the window.
Figure 3:
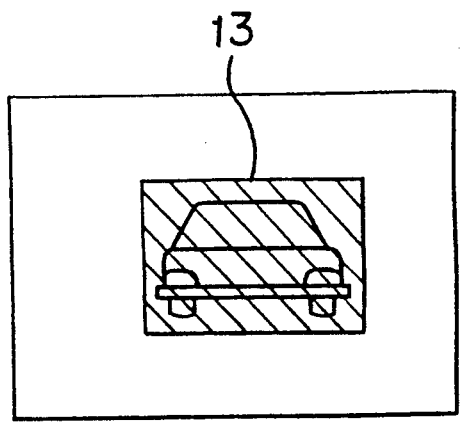
Figure 4:
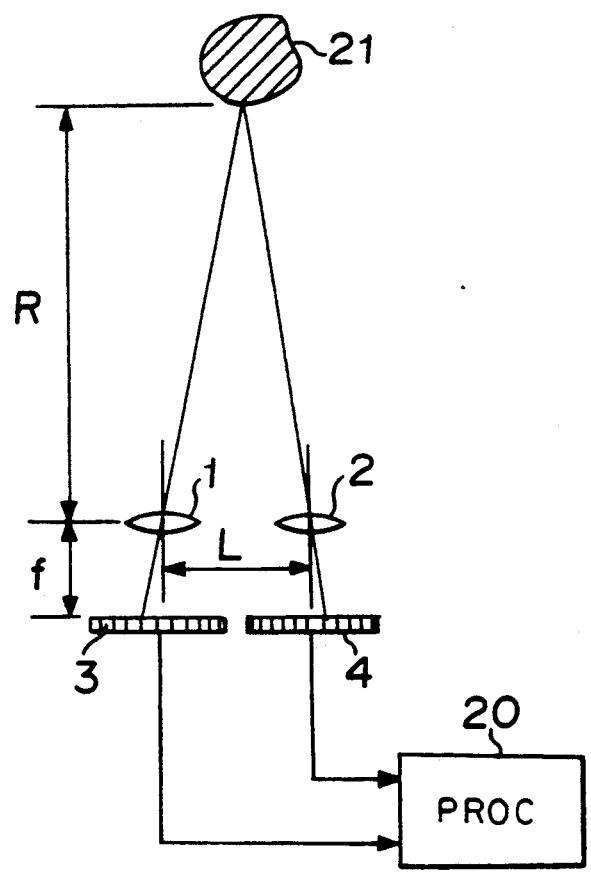
FIG. 4 is a construction diagram showing a conventional distance detecting device.

At this time, as shown in FIG. 3, as a domain which is related to the calculation, with respect to the reference image signal in the window 13, the domain 15 corresponds with the image in the memory 8.

As stated above by comparing the left and right image elements, and assuming that the shift quantity of the element which minimizes the total sum of the absolute value of the difference of signals, is "n" image elements, the pitch of the image element, "p", the base length of the optical system, "L", the focal length of the lenses 1 and 2, "f", and the distance to the foregoing car 5, "R", is obtained by the following equation.

$$R = \frac{f \cdot L}{n \cdot P}$$

By this method, the inter-vehicle distance between a driving car and a preceding car can continuously be obtained by setting the preceding car, and by tracking it, in spite of the left or right movement of the preceding car 5.

As explained above, according to the invention, when a preceding car to be tracked, enters in the window of the display, the driver turns ON the instruction switch for starting up the tracking operation. After that the image tracking operation of the preceding car image is performed by this window. Therefore the driver can easily perform the image tracking continuously only by operating the above instruction switch while he is driving the car. Furthermore, since the window frame and the preceding car in the window frame are always displayed on a display, even in the case in which a plurality of preceding cars are running ahead, the driver can notice the preceding car which is followed by the driving car that detects the inter-vehicle distance to the preceding car.

Obviously, numerous modifications and variations of the present invention are possible in light of the above teachings. It is therefore to be understood that within the scope of the appended claims, the invention may be practiced otherwise than as specifically described herein.

What is claimed is:

1. An inter-vehicle distance detecting device for automatic tracking of a preceding car which comprises:
   image sensors for taking images of a preceding car;
   displaying means for displaying one of the images of the preceding car being taken by the image sensors;
   means for establishing an image taking window and for automatically repeatedly moving said window forward and backward horizontally from one end to the other end of a display of the displaying means at a predetermined speed;
   an image tracking starting switch being activated by a driver;
   image tracking means for tracking the image of the preceding car, responsive to the image tracking starting switch when the image of the preceding car enters in the image taking window; and
   detecting means for detecting an inter-vehicle distance between a car of the driver and the preceding car being displayed on the image taking window.

2. A vehicle control apparatus comprising:
   a pair of optical lenses, arranged in parallel relation with each other, for receiving an image of an object in front of a vehicle;
   a pair of image sensors, each receiving the image from a respective one of said pair of optical lenses, for converting the image into digital information;
   first and second memory devices for respectively storing digital information concerning the image from one of said pair of image sensors;
   a control device for successively shifting the digital information in said second memory and comparing such information with the digital information stored in said first memory, said control device producing a difference value for each successive shift and determining which of the successive shifts results in a minimum difference value, said control device calculating a first distance interval that is the distance between the vehicle and the object directly in front of the vehicle taking into account the difference value; and
   a display device for displaying a window and the image of the object,
   wherein said control device includes means for repeatedly moving the window transversely across said display device at a predetermined speed until an actuation switch is activated in response to the image of the object being within the window on said display device.

3. The vehicle control apparatus of claim 2, wherein the window initially repeatedly moves in a horizontal direction across said display device.

* * * * *